(12) United States Patent
Dikshit et al.

(10) Patent No.: US 12,287,097 B2
(45) Date of Patent: Apr. 29, 2025

(54) KITCHEN-CONNECTED INDOOR STATIONARY SOLAR COOKING DEVICE

(71) Applicant: INDIAN OIL CORPORATION LIMITED, Maharashtra (IN)

(72) Inventors: Vibhav Dikshit, Faridabad (IN); Vinay Tiwari, Faridabad (IN); Umish Srivastva, Faridabad (IN); Sudhir Kumar Singh, Noida (IN); Deepak Saxena, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 819 days.

(21) Appl. No.: 17/404,758

(22) Filed: Aug. 17, 2021

(65) Prior Publication Data

US 2022/0057086 A1    Feb. 24, 2022

(30) Foreign Application Priority Data

Aug. 18, 2020 (IN) .............................. 202021035586

(51) Int. Cl.
*F24C 1/04* (2021.01)
*F24C 7/08* (2006.01)
(Continued)

(52) U.S. Cl.
CPC ................ *F24C 1/04* (2013.01); *F24C 7/087* (2013.01); *F24C 15/107* (2013.01); *F24C 15/14* (2013.01); *F28D 19/04* (2013.01); *H02S 99/00* (2013.01)

(58) Field of Classification Search
None
See application file for complete search history.

(56) References Cited

U.S. PATENT DOCUMENTS 2,102,616 A * 12/1937 Ehret ........................ F24C 1/00
126/1 R
3,492,985 A *  2/1970 Linert ................. A47J 37/0704
261/50.1
(Continued)

FOREIGN PATENT DOCUMENTS

IN   1343/DEL/2009 B   1/2011
IN   3656/DEL/2012      2/2013
(Continued)

OTHER PUBLICATIONS

"Hybrid indirect solar cooker with latent heat storage", International Journal of Engineering Science & Research Technology, Ibrahim* et al., 5(7): Jul. 2016.
(Continued)

*Primary Examiner* — Edelmira Bosques
*Assistant Examiner* — Deepak A Deean
(74) *Attorney, Agent, or Firm* — Maschoff Brennan

(57) ABSTRACT

A modular kitchen-connected indoor stationary solar cooking device (102) is disclosed. The solar cooking device (102) includes a housing (202), a thermal battery (204) disposed in the housing (202) and adapted to store thermal energy, and a first heater (206) disposed to be in contact with the thermal battery (204). The first heater (206) is coupled to a solar array (104) and adapted to receive solar energy for charging the thermal battery (204). The solar cooking device (102) includes a second heater (208) disposed to be in contact with the thermal battery (204). The second heater (208) is coupled to a mains supply and adapted to receive electrical supply for charging the thermal battery (204). The solar cooking device (102) includes a heat control assembly (210) disposed on a cooktop (802) and adapted to accommodate a cooking vessel. The heat control assembly (210) is adapted (Continued)

to rotate for controlling a heat supply for cooking in the cooking vessel.

23 Claims, 18 Drawing Sheets

(51) Int. Cl.
  *F24C 15/10* (2006.01)
  *F24C 15/14* (2006.01)
  *F28D 19/04* (2006.01)
  *H02S 99/00* (2014.01)

(56) References Cited

U.S. PATENT DOCUMENTS

| | | | | |
|---|---|---|---|---|
| 3,515,119 | A * | 6/1970 | Kivela | F24C 7/10 |
| | | | | 219/202 |
| 5,293,447 | A | 3/1994 | Fanney et al. | |
| 5,531,354 | A * | 7/1996 | Uy | A47J 36/064 |
| | | | | 220/366.1 |
| 6,425,419 | B1 * | 7/2002 | Attra | F24F 13/0263 |
| | | | | 138/132 |
| 2005/0095419 | A1 * | 5/2005 | Raeburn | B32B 5/24 |
| | | | | 428/319.1 |
| 2007/0214968 | A1 * | 9/2007 | Larson | A47J 37/1295 |
| | | | | 99/403 |
| 2011/0107723 | A1 * | 5/2011 | Hurlburt | B32B 13/08 |
| | | | | 52/794.1 |
| 2014/0352199 | A1 * | 12/2014 | Matney | A01M 23/04 |
| | | | | 43/61 |
| 2015/0374171 | A1 * | 12/2015 | Buerkle | A47J 37/0704 |
| | | | | 126/25 A |
| 2020/0340677 | A1 * | 10/2020 | Thakkar | F24C 7/087 |
| 2021/0030202 | A1 * | 2/2021 | Sauar | F24S 20/30 |
| 2021/0318034 | A1 * | 10/2021 | Litchfield | F24S 50/20 |

FOREIGN PATENT DOCUMENTS

| | | |
|---|---|---|
| IN | 201841000300 | 7/2019 |
| WO | 2014/192019 A2 | 12/2014 |
| WO | 2017/205864 A1 | 11/2017 |

OTHER PUBLICATIONS

"Photovoltaic and thermal hybridized solar cooker", International Scholarly Research Notices, vol. 2013, article id 746189, 5 pages, 2013.

eCook—the near future landscape of cooking in urban areas in Africa, Conference on Strategies for Sustainable Energy Transitions in Urban Sub-Saharan Africa—SETUSA, Jun. 2017.

* cited by examiner

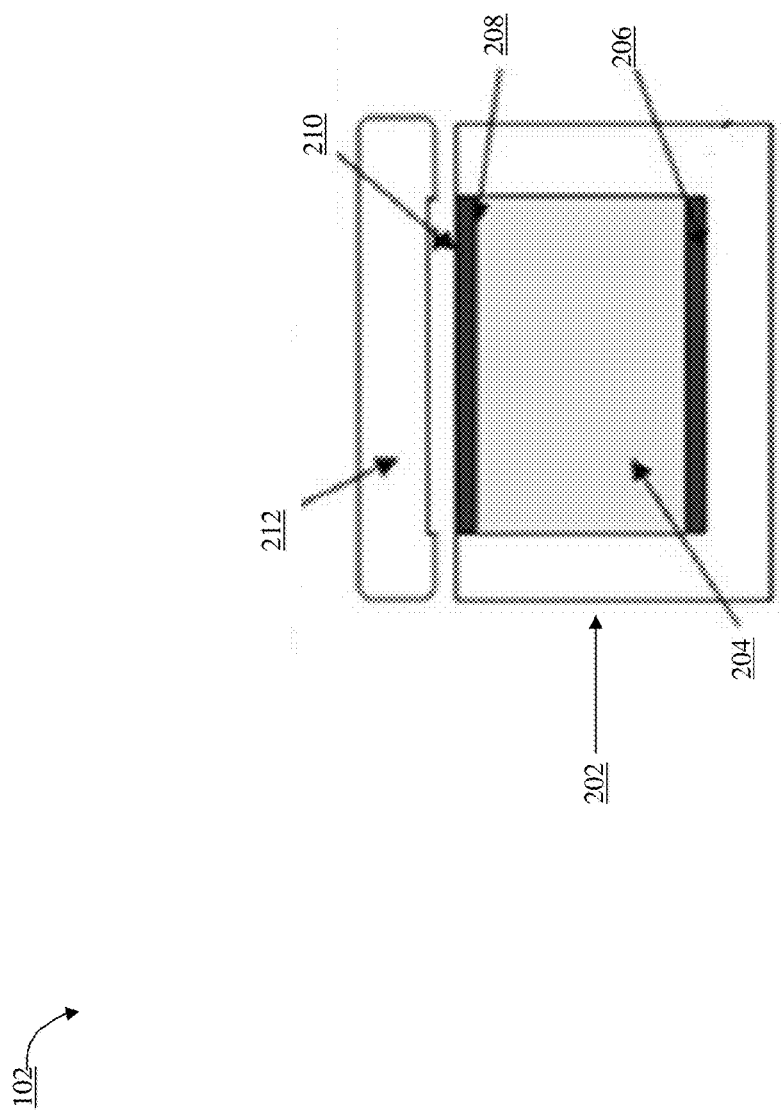

| Case | | Internal Temperature of Thermal Storage Material (°C) | Water Temperature (°C) | Duration (Minute) |
|---|---|---|---|---|
| Without using heat control configuration | | 330-250 | 30 - 94 | 35 |
| Aluminum plate with threads | Step 1 | 330 - 250 | 30 - 94 | 40 |
| | Step 2 | 330 - 250 | 30 - 94 | 45 |
| | Step 3 | 330 - 250 | 30 - 94 | 50 |
| Circulate plate with 6 legs | | 330 - 250 | 30 - 94 | 65 |
| Circulate plate with 4 legs | | 330 - 250 | 30 - 94 | 75 |

Figure 8A

KITCHEN-CONNECTED INDOOR STATIONARY SOLAR COOKING DEVICE

FIELD OF THE INVENTION

The present disclosure relates to a solar cooking device and particularly to a kitchen-connected, heat controllable, spillage-proof, safe, durable, modular, indoor stationary solar cooking device.

BACKGROUND

Over the last few decades, significant efforts have continuously been invested in designing and developing solar cookers that mostly utilize heat of the sun to cook food. Particularly, for household cooking, two types of solar cookers are generally deployed, i.e., direct cooking devices such as a solar thermal cooker (traditional as well as concentrating types) and indirect cooking devices such as a solar PV cooker (induction cooktop coupled with battery and solar panels).

Currently, there exist several direct cooking devices with different configuration, for example, thermal storage-based cooker charged through solar concentrator and cooker based on direct cooking in outdoor sun light.

Particularly, P1 [WO2014/192019 A2] discloses a device and an apparatus for portable storage of thermal energy. The device includes a core for storing thermal energy, one or more transfer interfaces, and a core insulation. The transfer interface communicates energy from an external source to the core and communicates energy stored in the core to an external recipient. A portable thermal storage device is kept outside for charging through a solar concentrator, for example, through a parabolic reflector or any other means to concentrate sunlight to a single point. Once charged, the device is brought back in the kitchen for cooking. Therefore, portability requirement of the storage device for charging (outside) would need human intervention in regular time interval. Owing to usually heavy weight of the storage device, such frequent handling of the device is inconvenient to the user and may even pose safety concerns.

Further, P2 [WO2017/205864 A1] discloses a portable rechargeable vessel for collecting, storing, and recovering thermal energy. The vessel is insulated and includes a Phase Change Material (PCM) for storing the thermal energy. The vessel needs to be placed on a solar concentrator located outside for charging, i.e., to gain temperature and accordingly store heat. After charging, the device must be brought back into the kitchen for cooking purpose. Therefore, in this case as well, the device needs to be regularly moved, posing significant inconvenience to the user.

P3 [3656/DEL/2012] also discloses a device for cooking by means of solar heat. The device includes a food container or a drink container facing a mirror which rides on a spherical ball tightly rolling in a spherical receptacle. This cooker is specifically meant for outside cooking in daytime only and does not provide for any storage provision, say, for cooking during the night or on cloudy days.

Further, P4 [1343/DEL/2009] relates to a solar cooker having a platform filled with insulation along with a fiber glass sheet on its top. The platform is supporting at least one cooking pot and is provided with a concentrator. This device is also not meant for being used during the night or cloudy days.

As would be gathered, the existing direct solar cooking devices do not provide a comprehensive solution for cooking. First, all such devices need to be regularly transported from one place to another, say for charging and then for usage. This would require frequent human intervention during the usage of the solar cooking device. Moreover, regular handling of the heavy devices may even pose significant inconvenience to the user, even leading to safety concerns. Moreover, the existing devices do not offer a solution for cooking on the cloudy days or during the night.

Patent Landscape Report on Solar Cooking published by WIPO in 2011 mentions several patents on indirect cooking techniques where usage of optical fiber cables for transferring the light energy and converting it into heat energy at the point of cooking has been mentioned. Of late, owing to falling solar PV prices, utilization of solar PV panels to facilitate domestic applications like water heating, room heating, cooking etc by converting electricity into heat has gained interest of several researchers. Some disclosures have used solar PV generated electricity and storing it in the electrical batteries coupled with induction cook tops.

Several published literatures have been reported where solar photo voltaic generated electricity has been shown to be converted into heat for various domestic and industrial applications, such as water heating geysers and cooking ["Hybrid indirect solar cooker with latent heat storage", International Journal of Engineering Science & Research Technology, Ibrahim* et al., 5(7): July, 2016; "Photovoltaic and thermal hybridized solar cooker", International Scholarly Research Notices, volume 2013, article id 746189, 5 pages, 2013; "eCook—the near future landscape of cooking in urban areas in Africa", Conference on Strategies for Sustainable Energy Transitions in Urban Sub-Saharan Africa—SETUSA, June 2017].

Some prior arts have used direct utilization of solar photovoltaic generated electricity to heat using heaters, such as geysers and cooking, without any kind of energy storage.

P5 [U.S. Pat. No. 5,293,447] discloses a system for heating water using combination of solar energy through photovoltaic array and heaters. However, P5 does not disclose heat storage aspects.

P6 [Indian Patent 344330] discloses a cooking system which includes thermal storage capable of storing thermal energy using electric power from energy source and a heat exchanger circuit for transferring the thermal energy from the thermal storage to a cooking unit. There are multiple energy conversions mentioned in this disclosure as it mentions of utilizing the heat exchangers. It also utilizes same heaters to receive different nature of electric power, which can be inefficient and not able to charge simultaneously from two power sources. Also, features like mechanical heat controls, spillage proofness, and safety of humans have not been mentioned.

P7 [IN201841000300] discloses a system which includes a reception device configured to receive and convert solar energy into a direct current. The cooking apparatus includes a heating element configured to operate the solar cooking system using the direct current. The solar cooking system includes a controller unit coupled to the reception device to control the supply of the direct current to the cooking apparatus. The invention also does not talk of heat storage spillage proofness and heat control aspects.

Thus, with the increased interest in using solar photo voltaic energy for heating and cooking purposes, newer applications and more efficient appliances are the next logical transition in the state-of-the-art. The way forward for achieving the higher performance in such systems shall be inventions related to minimization of electricity-to-heat conversion losses, minimization of losses in transfer of heat to cooking utensil, minimization of standby stored heat losses from the storage medium, effective and controlled heating and cooking mechanisms, inventions facilitating efficient utilization of the system during continued non-Sunny periods, spillage proofness of the cooking devices, modularity of uses, and safety to guard against high temperature human exposures. The prior arts based on utilization of electricity to heat and cooking, through conversion of electricity to heat and also the transfer of stored heat through various means, such as pumps and heat exchangers for cooking, designing the same heating element to receive all types, and nature of electricity shall involve higher conversion losses and can be costly. Moreover, features, such as spillage proofness, modularity of uses, and safety to guard against high temperature human exposure are not covered much in the prior art.

Such details are necessary for the betterment of the solar cooking technology and are vital for efficient and effective performance of the cooking devices.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

In an embodiment of the present disclosure, a modular kitchen-connected indoor stationary solar cooking device is disclosed. The solar cooking device includes a housing, a thermal battery disposed in the housing and adapted to store thermal energy, and a first heater disposed to be in contact with the thermal battery. A thermal battery is a physical structure used for the purpose of storing and releasing thermal energy. Such a thermal battery allows energy available at one time to be temporarily stored and then released at another time. The basic principles involved in a thermal battery occur at the atomic level of matter, with energy being added to or taken from either a solid mass or a liquid volume which causes the substance's temperature to change. The first heater is coupled to a solar array and adapted to receive solar energy for charging the thermal battery. The solar cooking device includes a second heater disposed to be in contact with the thermal battery. The second heater is coupled to a mains (electric grid) supply and adapted to receive electrical supply for charging the thermal battery. The second heater may also directly be used for cooking. The solar cooking device further includes a heat control assembly disposed on a cooktop and adapted to accommodate a cooking vessel. The heat control assembly is adapted by various mechanical means for controlling the heat supply for cooking in the cooking vessel.

In another embodiment of the present disclosure, a modular solar cooking apparatus is disclosed. The apparatus includes a solar array, a mains supply adapter, and a kitchen-connected indoor stationary solar cooking device coupled to the solar array and the mains supply. The solar cooking device includes a housing, a thermal battery disposed in the housing and adapted to store thermal energy, and a first heater disposed to be in contact with the thermal battery. The first heater is coupled to a solar array and adapted to receive solar energy for charging the thermal battery. The solar cooking device includes a second heater disposed to be in contact with the thermal battery. The second heater is coupled to the mains supply and adapted to receive electrical supply for charging the thermal battery. The solar cooking device also includes a heat control assembly disposed on a cooktop and adapted to accommodate a cooking vessel. The heat control assembly is adapted to control a heat supply for cooking.

To further clarify the advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2A illustrates a schematic view of the solar cooking device, according to an embodiment of the present disclosure;

FIG. 8A illustrates a table indicating heating temperature and time taken for boiling the water using different embodiments of the heat control assembly, according to an embodiment of the present disclosure;

Figure 1:
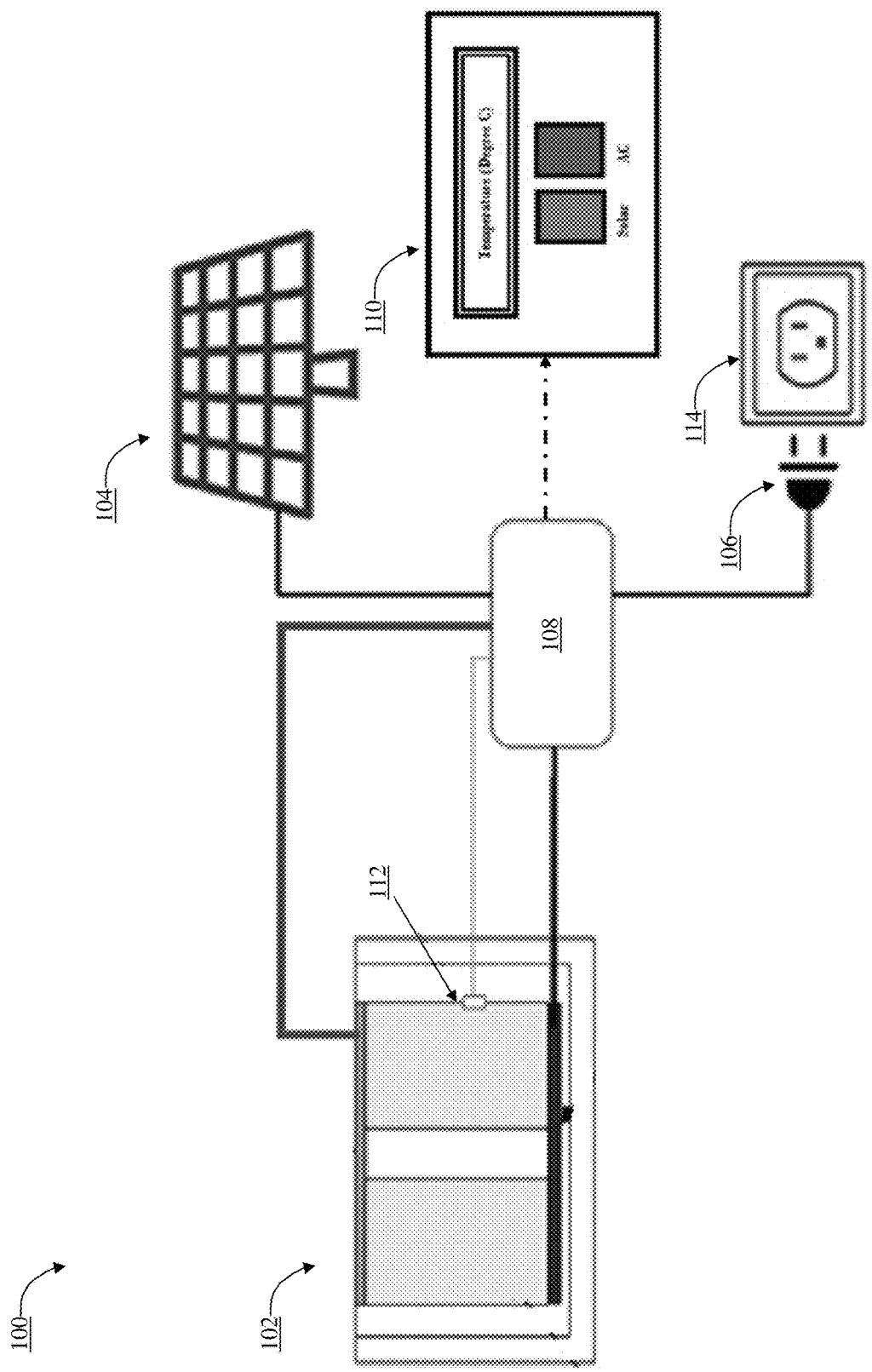
FIG. 1 illustrates a schematic view of an environment depicting implementation of a solar cooking apparatus having a kitchen-connected indoor stationary solar cooking device, according to an embodiment of the present disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF FIGURES

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which this invention belongs. The system, methods, and examples provided herein are illustrative only and not intended to be limiting.

For example, the term "some" as used herein may be understood as "none" or "one" or "more than one" or "all." Therefore, the terms "none," "one," "more than one," "more than one, but not all" or "all" would fall under the definition of "some." It should be appreciated by a person skilled in the art that the terminology and structure employed herein is for describing, teaching, and illuminating some embodiments and their specific features and elements and therefore, should not be construed to limit, restrict, or reduce the spirit and scope of the present disclosure in any way.

For example, any terms used herein such as, "includes," "comprises," "has," "consists," and similar grammatical variants do not specify an exact limitation or restriction, and certainly do not exclude the possible addition of one or more features or elements, unless otherwise stated. Further, such terms must not be taken to exclude the possible removal of one or more of the listed features and elements, unless otherwise stated, for example, by using the limiting language including, but not limited to, "must comprise" or "needs to include."

Whether or not a certain feature or element was limited to being used only once, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language including, but not limited to, "there needs to be one or more . . . " or "one or more element is required."

Unless otherwise defined, all terms and especially any technical and/or scientific terms, used herein may be taken to have the same meaning as commonly understood by a person ordinarily skilled in the art.

Reference is made herein to some "embodiments." It should be understood that an embodiment is an example of a possible implementation of any features and/or elements of the present disclosure. Some embodiments have been described for the purpose of explaining one or more of the potential ways in which the specific features and/or elements of the proposed disclosure fulfil the requirements of uniqueness, utility, and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or other variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or in the context of more than one embodiment, or in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not necessarily be taken as limiting factors to the proposed disclosure.

For the sake of clarity, the first digit of a reference numeral of each component of the present disclosure is indicative of the Figure number, in which the corresponding component is shown. For example, reference numerals starting with digit "1" are shown at least in FIG. 1. Similarly, reference numerals starting with digit "2" are shown at least in FIG. 2.

Embodiments of the present invention will be described below in detail with reference to the accompanying drawings.

FIG. 1 illustrates a schematic view of an environment depicting implementation of a solar cooking apparatus 100 having a kitchen-connected indoor stationary solar cooking device 102, according to an embodiment of the present disclosure. For the sake of readability, the solar cooking apparatus 100 and the kitchen-connected indoor stationary solar cooking device 102 are hereinafter referred to as the apparatus 100 and the solar cooking device 102, respectively. As the name suggests, the solar cooking device 102 is adapted to be conveniently used in any indoor premises, say, in the kitchen, while being separately or simultaneously charged by the solar energy as well as grid electricity.

The apparatus 100 may include a solar array 104, a mains supply adapter 106, and the solar cooking device 102 coupled to the solar array 104 and the mains supply through the adapter 106. The solar array 104 may include one or more solar panels disposed to directly receive the solar energy. Therefore, the solar array 104 may be disposed outdoors where the solar rays are directly incident on the solar panels. The solar array 104 may be coupled to the solar cooking device 102, for example, through connecting wires.

Further, the mains supply adapter 106 may be adapted to be plugged into a mains supply power socket 114. The mains supply adapter 106 may also be coupled to the solar cooking device 102 through respective connecting wires. Therefore, the solar cooking device 102 is adapted to be operated based on the supply of the operating power from the solar array 104 and the mains supply.

Figure 2B:
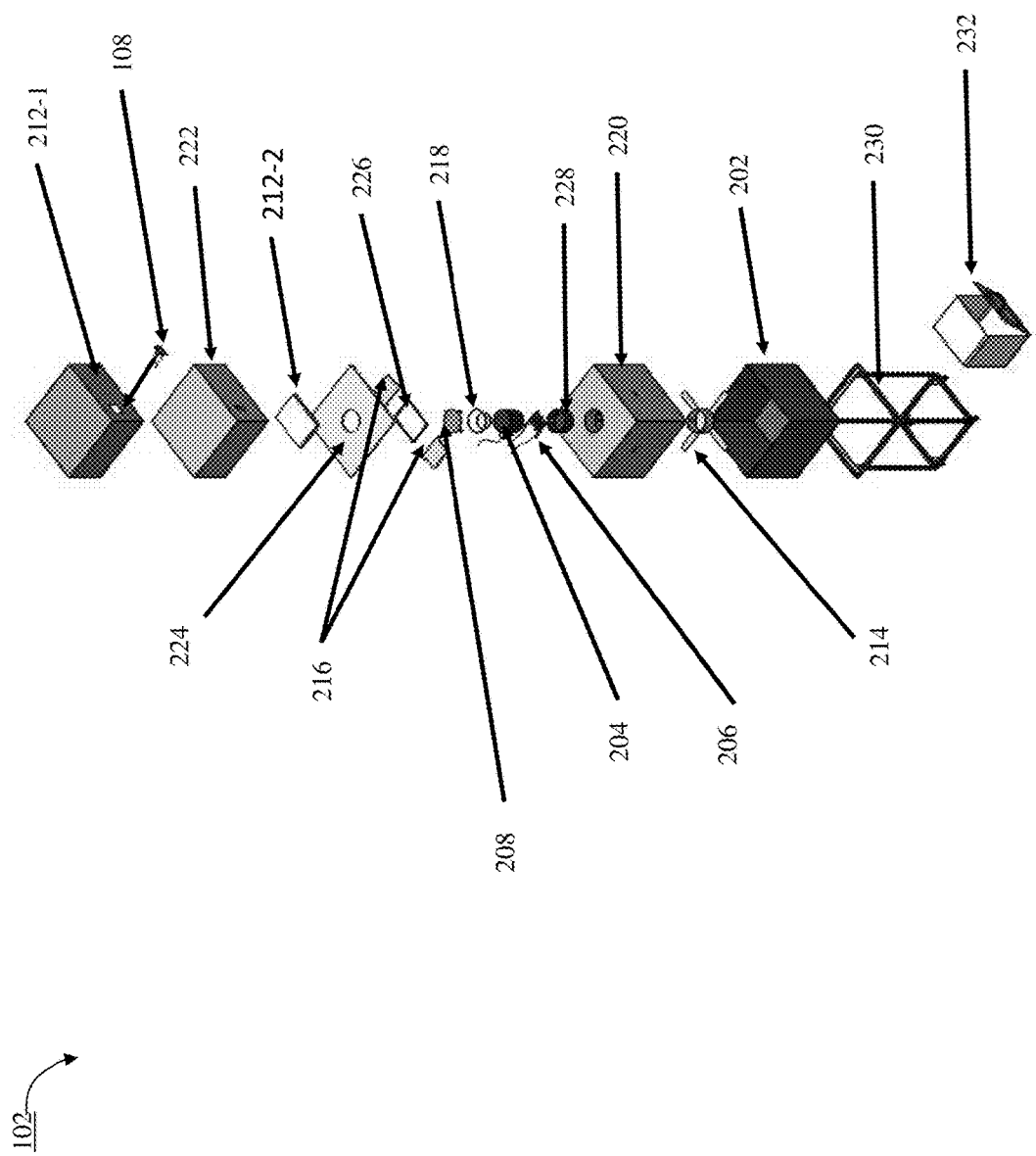
FIG. 2B illustrates an exploded view of the solar cooking device, according to an embodiment of the present disclosure.

FIG. 2A illustrates a schematic view of the solar cooking device 102, according to an embodiment of the present disclosure. FIG. 2B illustrates an exploded view of the solar cooking device 102, according to an embodiment of the present disclosure. Referring to FIG. 1, FIG. 2A, and FIG. 2B, the solar cooking device 102 may include, but is not limited to, a housing 202 and a thermal battery 204 disposed in the housing 202 and adapted to store thermal energy.

The thermal battery 204 is a physical structure used for the purpose of storing and releasing thermal energy. Such a thermal battery 204 allows energy available at one time to be temporarily stored and then released at another time. The basic principles involved in a thermal battery 204 occur at the atomic level of matter, with energy being added to or taken from either a solid mass or a liquid volume which causes the substance's temperature to change.

In an embodiment, the thermal battery 204 may be disposed in the housing 202 through a fixing mechanism 214, which would fix the position of the thermal battery 204 within the housing 202, thereby eliminating the possibility of undesirable movement of the thermal battery 204 within the housing 202. For example, the thermal battery 204 may be held firmly in position with the help of the fixing mechanism 214, such as a fixed ring and a 4-way handle secured to an inner surface of the housing 202.

In an embodiment, the thermal battery 204 may include, but is not limited to, at least one of a thermal storage material, a sensible heat material, a petroleum derivative, and/or a phase change material. The thermal battery 204 may include a combination of thermal storage materials, such as a sensible heat storage material, a phase change material, a petroleum derivative, and any other similar heat storage material known in the art. In an embodiment, the sensible heat storage materials may be a combination of one or more materials or its various grades, such as silver, copper, aluminum, beryllium, and various grades of steel.

In an embodiment, the thermal battery 204 may include a performance enhancing additive material, for example, inorganic metal chips of at least one of silver, copper, aluminium, carbon nano-tubes, and graphene to increase the thermal performance.

Further, the thermal battery 204 may be of one of a cuboidal profile, cylindrical profile, a conical profile, and a pyramidical profile. In another embodiment, the thermal battery 204 may have a profile that is a combination of such geometrical shapes with suitably chosen dimensions to have minimum exposed surface area and minimum heat loss.

As would be appreciated by a person skilled in the art, the profiles of the thermal battery 204 are not limited to the abovementioned and the thermal battery 204 may be formed in any other profile, say, depending on operational requirements, without departing from the scope of the present disclosure.

In an embodiment, the thermal battery 204 and the housing 202 may be insulated with at least one of Asbestos, Fiberglass, Ceramic fiber, Polycrystalline fiber, and any other insulation material known in the art. In an embodiment, outer surfaces of the thermal battery 204 and the inner surface of the housing 202 may be coated with a heat-resistant and thermal-insulation paint, for example, to reduce the radiative heat loss.

In an embodiment, the thermal battery 204 may be insulated by multiple layers of graded insulating materials. In an embodiment, the graded insulation may be achieved based on quality of heat retention (Low temperature: up to 150° C.; Medium temperature: 150° C.-350° C.; High Temperature: 350° C.-1000° C.) depending upon type, time, duration, and quantity of food to be cooked.

Figure 3:
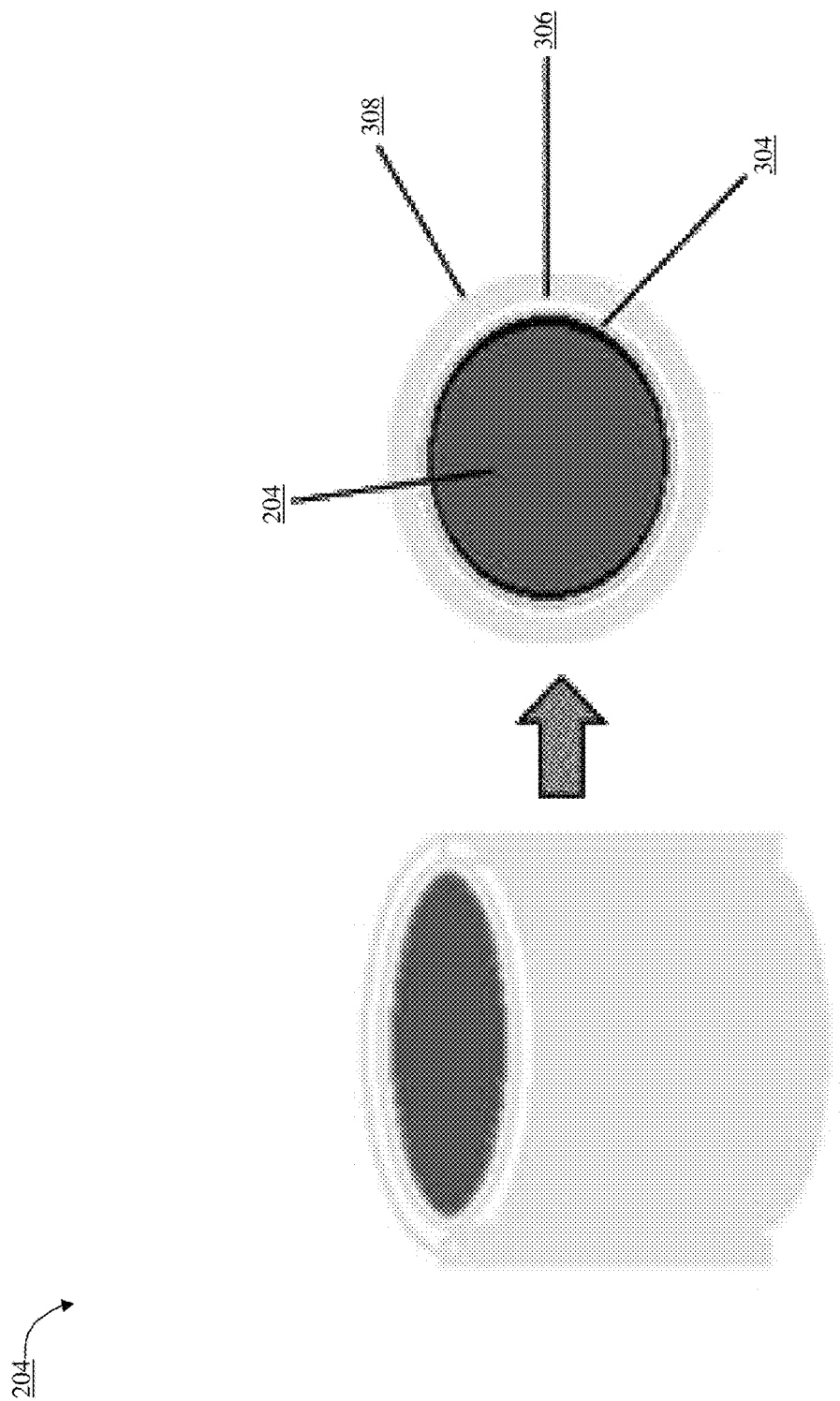
FIG. 3 illustrates a schematic view depicting multi-layer insulation of a thermal battery of the solar cooking device, according to an embodiment of the present disclosure.

FIG. 3 illustrates a schematic view depicting multi-layer insulation of the thermal battery 204, according to an embodiment of the present disclosure. As illustrated, an outer surface of the thermal battery 204 may be insulated in a graded manner by a first layer 304 of a high temperature heat resistant paint, a second layer 306 of a reflector formed on the first layer 304, and a third layer 308 of another insulation material formed on the second layer 306. In an embodiment, the reflector may include, but is not limited to, a polished mirror reflector and an Aluminum reflector to ward off Infrared (IR) reflection. In an embodiment, the reflector can be in the form of a foil or a paper for being wrapped around the first layer 304. In an embodiment, vacuum may also be provided between the insulation layers to minimize the heat loss. This would reduce heat loss from the thermal battery 204. Therefore, the thermal battery 204 as well as the housing 202 are insulated to ensure that the energy stored therein is efficiently managed leading to minimal wastage. Due to the multi-layer insulation, in an example, an average standby heat loss is minimized at a rate of <7% per hour.

As would be appreciated by a person skilled in the art, the number and positioning of layers of the insulation of the thermal battery 204 may vary in other embodiments, for example, depending on constructional and operational requirements of the solar cooking device 102, without departing from the scope of the present disclosure. Therefore, different configurations of insulation arrangement may be achieved as per different grade of insulations based on their thermal and physical properties, such as density, operating temperature limits, thermal conductance, thermal conductivity, emissivity, and thermal transmittance.

Referring to FIG. 1, FIG. 2A, and FIG. 2B, the solar cooking device 102 may include a first heater 206 and a second heater 208 disposed to be in contact with the thermal battery 204. In the illustrated embodiment, the first heater 206 and the second heater 208 may be disposed to contact a bottom surface and a top surface, respectively, of the thermal battery 204. In another embodiment, the first heater 206 and the second heater 208 may be disposed to contact the top surface and the bottom surface, respectively, without departing from the scope of the present disclosure. In other embodiments, the first heater 206 and the second heater 208 may be disposed in any other arrangement, for example, sideways with the thermal battery 204, without departing from the scope of the present disclosure. Further, in an embodiment, the first heater 206 and the second heater 208 may be integratedly embedded with the thermal battery 204.

Figure 4:
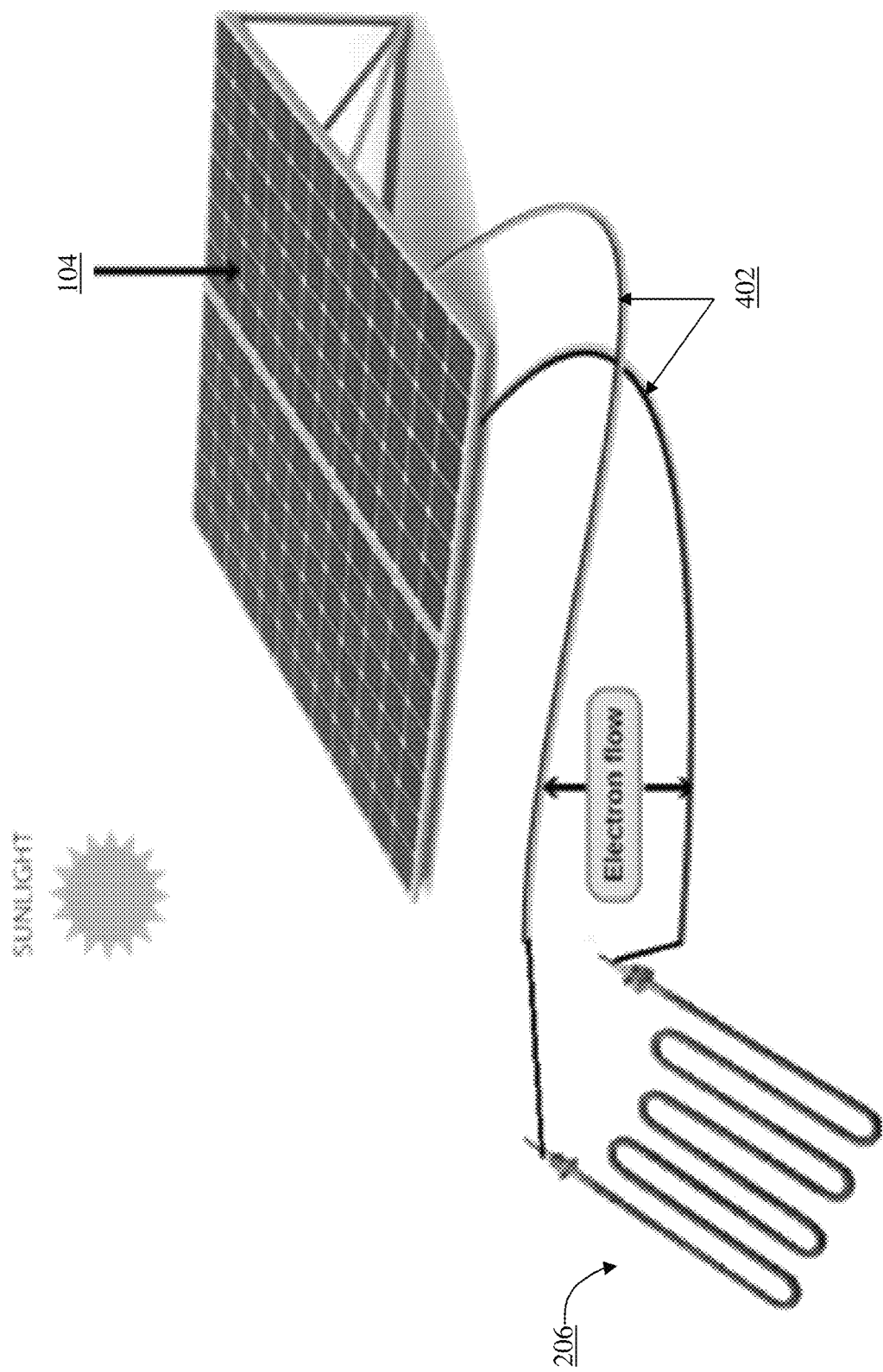
FIG. 4 illustrates connection of a first heater of the solar cooking device with a solar array, according to an embodiment of the present disclosure.

In an embodiment, the first heater 206 may be coupled to the solar array 104 and adapted to receive solar energy for charging the thermal battery 204. FIG. 4 illustrates connection of the first heater 206 with the solar array 104, according to an embodiment of the present disclosure. As illustrated, the first heater 206 may be connected to the solar array 104 through the connecting wires 402. The solar energy collected through the solar array 104 is transferred to the solar cooking device 102 for charging the thermal battery 204 with heat.

Figure 5:
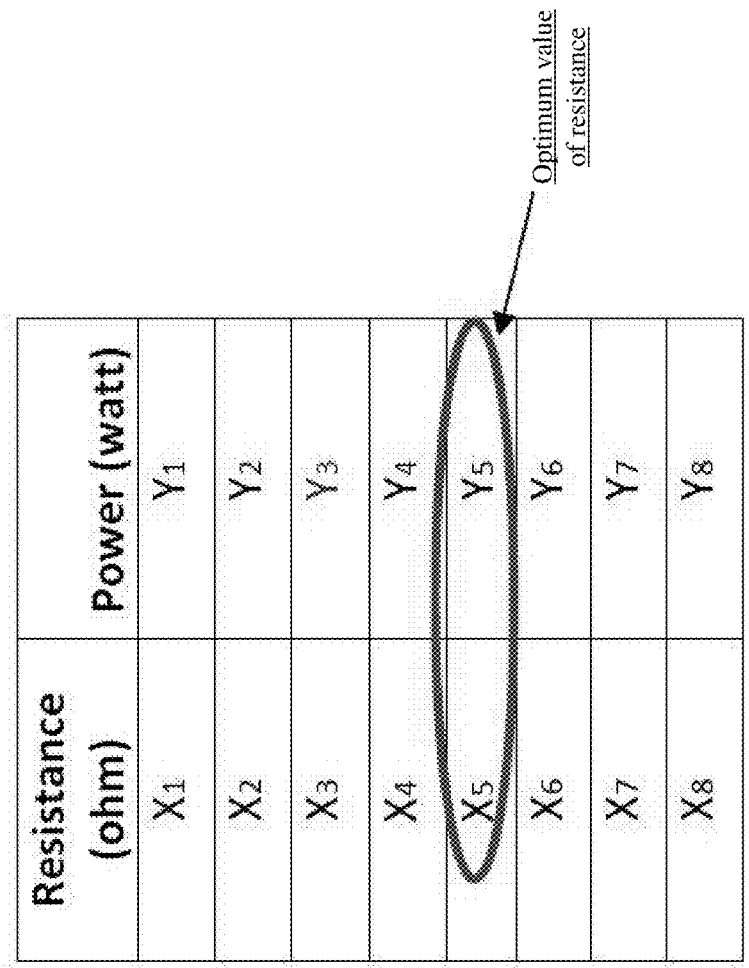
FIG. 5 illustrates a table depicting values of resistance of the first heater at varying power levels from the solar array, according to an embodiment of the present disclosure.
Figure 6:
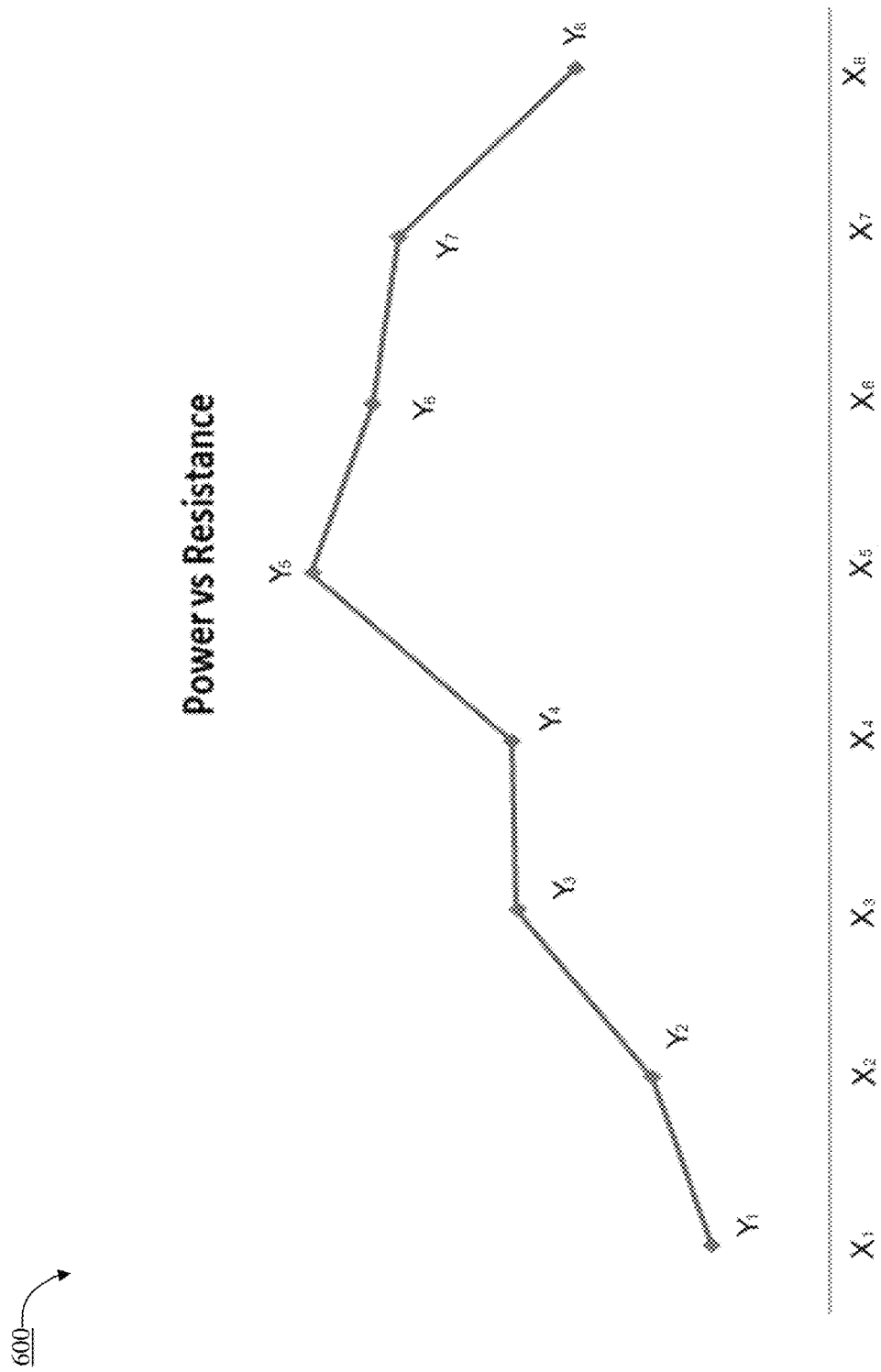
FIG. 6 illustrates a graph depicting values of the resistance of the first heater at varying power levels from the solar array, according to an embodiment of the present disclosure.

FIG. 5 illustrates a table 500 depicting values of resistance of the first heater 206 at varying power levels from the solar array 104, according to an embodiment of the present disclosure. The energy received from the solar array 104 is at lower voltage in comparison to the AC electrical grid, i.e., the mains supply. Therefore, the first heater 206 is specifically designed at optimized value of electrical resistance to minimize the electricity-to-heat conversion loss from the solar array 104. As illustrated, in an example, $x_5$ ohm is the optimum value of the resistance of the first heater 206 that minimizes the conversion loss from the solar array 104. FIG. 6 illustrates a graph 600 depicting values of the resistance of the first heater 206 at varying power levels from the solar array 104 as showed in the table 500, according to an embodiment of the present disclosure.

Referring to FIG. 1, FIG. 2A, and FIG. 2B, the second heater 208 may be coupled to the mains supply through the adapter 106. Therefore, the second heater 208 may be adapted to receive electrical supply from the mains supply power socket 114 for charging the thermal battery 204. The second heater 208 may be adapted to charge the thermal battery 204 during emergency and non-Sunny days. Therefore, when the solar array 104 is not able to collect any solar energy, for example, due to the cloudy weather, the thermal battery 204 can be charged and therefore the solar cooking device 102 can be operated based on the mains supply. In an embodiment, the second heater 208 may be adapted to operate at different value of electrical resistance to draw defined range of electrical power from the mains supply. Therefore, the thermal battery 204 is adapted to be charged through either the solar array 104 or the mains supply for the cooking purposes, depending on the presence of sunlight. In an embodiment, when the solar energy is not available, the second heater 208 may directly accept energy from the electric grid and can cook food without charging the thermal battery 204. Therefore, the second heater 208 may also directly be used for cooking.

Therefore, the first heater 206 and the second heater 208 may be adapted to accept energy, separately and simultaneously, from different sources and nature for charging the thermal battery 204.

As would be appreciated by a person skilled in the art, while only two heaters including their specific placement have been described in the illustrated embodiment, there can be multiplicity of heaters on multiple contact points of the thermal battery 204, throughout its surface, in other embodiments for more efficient heating. The heaters can be designed based on various input voltages and nature of various incoming power generating sources. The various heaters of the subject invention, receiving power from various sources, can also have the facility to electronically or otherwise regulator power to provide heat control during cooking.

In an embodiment, the solar cooking device 102 may also include a heat control assembly 210 disposed on a cooktop (shown in FIG. 8) and adapted to accommodate a cooking vessel (not shown). The cooktop 802 is carved from the top surface of the thermal battery 204. In fact, in an embodiment, the cooktop 802 may be understood to form a part of the thermal battery 204.

Figure 7:
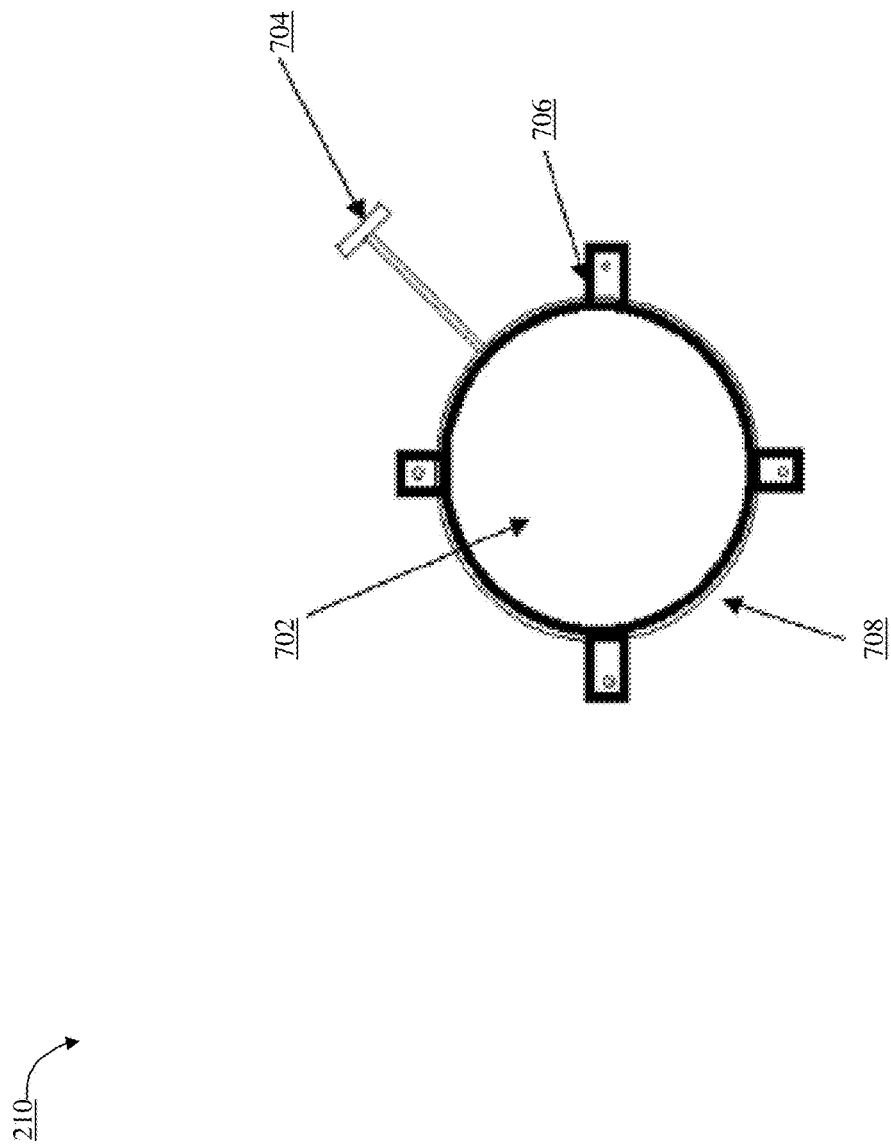
FIG. 7 illustrates a schematic top view of a heat control assembly of the solar cooking device, according to an embodiment of the present disclosure.

FIG. 7 illustrates a schematic top view of the heat control assembly 210, according to an embodiment of the present disclosure. The heat control assembly 210 may be adapted to rotate while being disposed on the cooktop for controlling a heat supply for cooking in the cooking vessel disposed thereon. In an embodiment, the thermal battery 204 may include external threads (not shown) on a top peripheral surface. Further, the heat control assembly 210 may be adapted to removably engage with the threads of the thermal battery 204, allowing the rotational movement with respect to the cooktop for controlling the cooking temperature.

In an embodiment, the heat control assembly 210 may include, but is not limited to, a top plate 702 adapted to accommodate the cooking vessel thereon and a ring portion 708 formed at a bottom of the top plate 702. The ring portion 708 may include internal threads (not shown) adapted to engage with the external threads of the thermal battery 204. Therefore, owing to the engagement and disengagement of the internal threads of the ring portion 708 with the external threads of the thermal battery 204, the heat control assembly 210 translates a vertical movement, varying the contact area between the cooktop and the top plate 702 and in turn the cooking vessel. The surface area of the contact between the top plate 702 and the cooktop may be proportional to the temperature of the cooking vessel.

The heat control assembly 210 may also include a handle 704 adapted to rotate the top plate 702 to control the engagement of the internal threads of the ring portion 708 with the external threads of the thermal battery 204. The top plate 702 is rotated to vary a contact area of the top plate 702 with the cooktop for controlling the cooking temperature of the cooking vessel. Varying the contact area would provide controlled heat release depending on the operational requirement.

In an embodiment, the heat control assembly 210 may include at least one clamp support 706 for locking the top plate 702 with the housing 202 in a predefined position. The clamp support 706 may also be adapted to lock the cooking vessel on the top plate 702. Therefore, the possibility of any undesired movement of the assembly is eliminated.

In other embodiments, the heat control assembly 210 may have different construction while ensuring that the objective of heat control for the cooking vessel is achieved. In an embodiment, the heat control assembly 210 may be an Aluminum or a Copper plate with threads. In another embodiment, the heat control assembly 210 may be formed as a circular plate with an elevation slit. In another embodiment, the heat control assembly 210 may be formed as a circular plate with 6 legs. In another embodiment, the heat control assembly 210 may be formed as a circular plate with 4 legs.

Figure 8B:
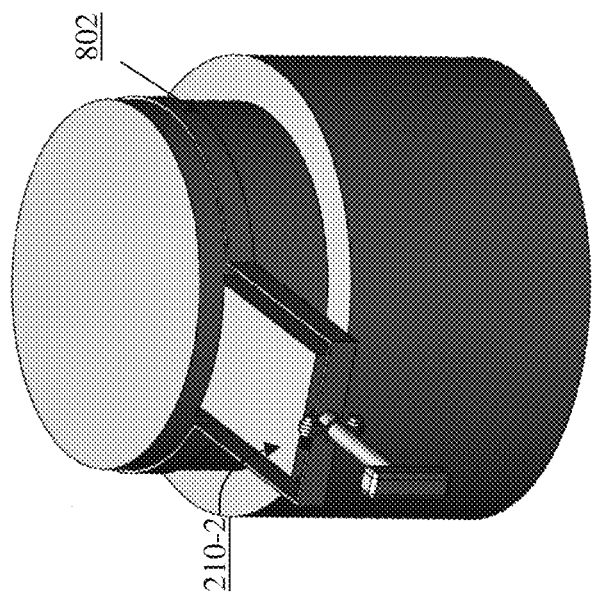
FIG. 8B illustrates perspective views of the heat control assembly, according to other embodiments of the present disclosure.
Figure 8B:
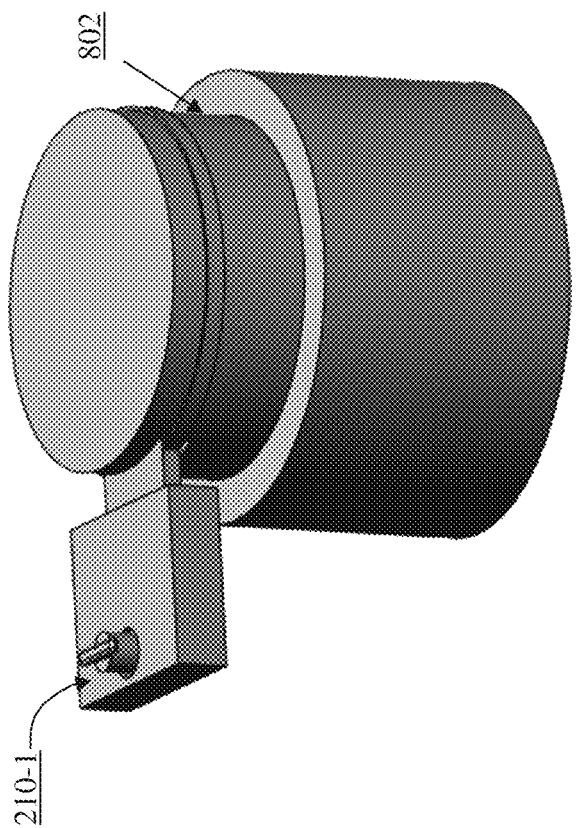

In an example, 1 liter of water boiled on the solar cooking device 102 using these different embodiments of the heat control assembly 210 to determine the respective heating properties. FIG. 8A illustrates a table 800 indicating heating temperature and time taken for boiling the water using different embodiments of the heat control assembly 210, according to an embodiment of the present disclosure. As illustrated, with the heat control assembly 210 of the embodiment shown in FIG. 7, i.e., Aluminum plate with threads, the water was boiled in 40 minutes, 45 minutes, and 50 minutes at different level of adjustments. FIG. 8B illustrates perspective views of the heat control assembly 210, according to other embodiments of the present disclosure.

As illustrated, a heat control assembly 210-1 and a heat control assembly 210-2 are shown to be disposed on the cooktop 802 of the thermal battery 204. Each of the heat control assembly 210-1 and 210-2 may include, but is not limited to, a ring attached with metal plate having a knob arrangement. The ring with the metal plate may directly be fitted on top of the thermal battery 204. As per rotation of the knob, the metal plate may move (left and right) inside the slot grooved in the top of the thermal battery 204. Accordingly, the adjustment of contact of the metal plate with the slot controls the cooking temperature of the cooking vessel.

Figure 9A:
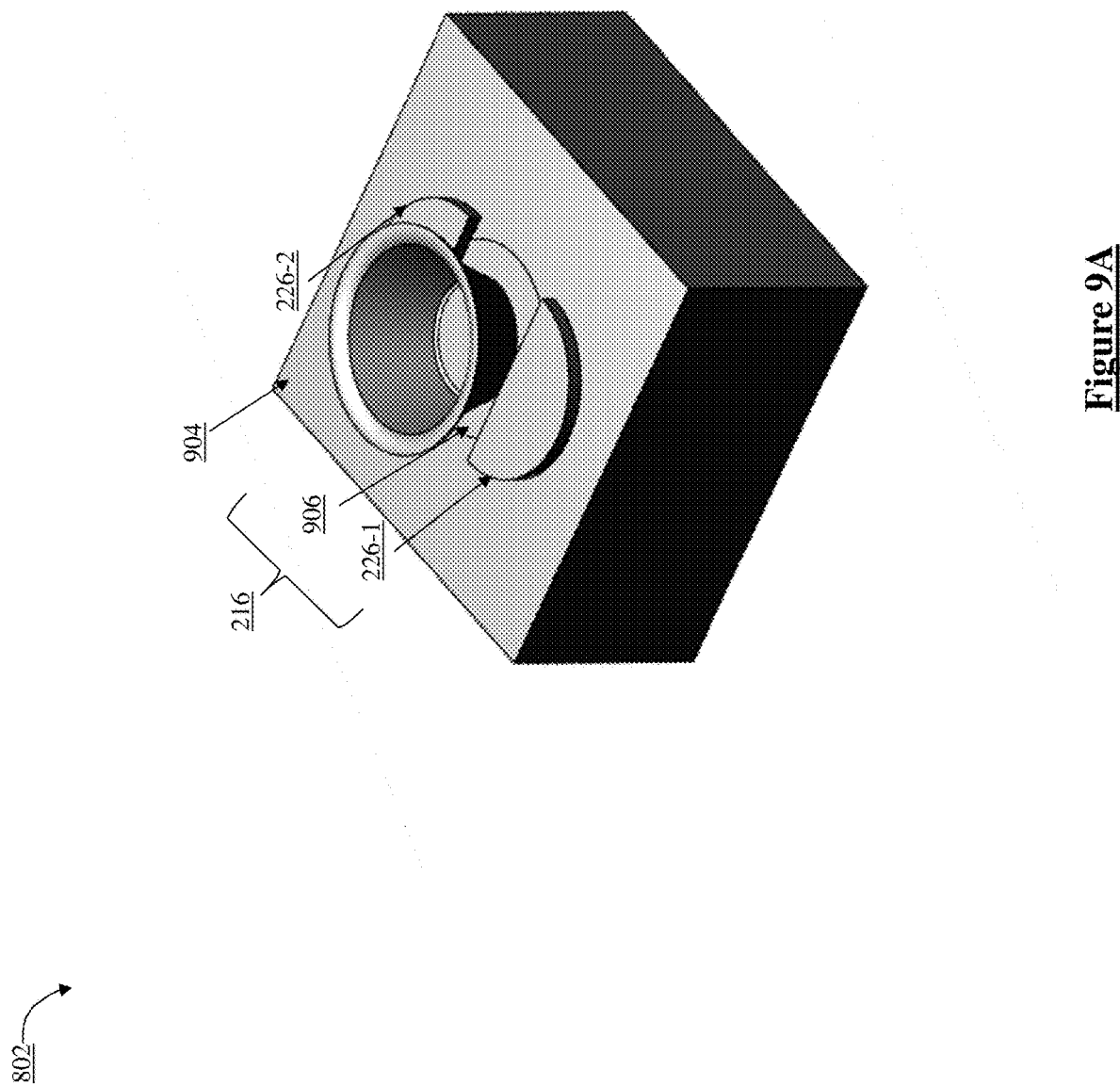
FIG. 9A illustrates a schematic perspective view of the thermal battery with a cooktop on a top surface and having an adjustable opening mechanism formed on the cooktop, according to an embodiment of the present disclosure.

FIG. 9A illustrates a schematic perspective view of the thermal battery 204 depicting the cooktop 802 on a top surface 904, according to an embodiment of the present disclosure. In an embodiment, the cooktop surface 904 may be formed of at least one of a heat resistant plastic, a composite, a metal, and wood. Further, the solar cooking device 102 may include a mechanical device 216 that provides variable opening to the cooktop 802, which reduces the heat loss as well as acts as a safety feature to avoid human contact with the hot cooktop 802 when no utensil is kept on it for cooking. Therefore, the cooktop 802 may be adapted to open to accommodate the cooking vessel for cooking.

In an embodiment, the mechanical device 216 may be an adjustable opening mechanism 216 formed on the cooktop 802. The mechanism 216 may be a sensor-based electronic device. The mechanism 216 may include an opening 906 and an insulated circular disc 226 positioned on the opening 906. The insulated circular disc 226 may be adapted to open and close to expose the opening 906 for placement of the cooking vessel. In an embodiment, the insulated circular disc 226 may be formed in two semi-circles, 226-1 and 226-2, that are adapted to move away from each other to expose the opening 906 and move towards each other to close the opening 906. Therefore, the circular disc 226 may be formed by combination of two complimenting halves 226-1 and 226-2.

The mechanism 216 may be adapted to open based on a pressure of the cooking vessel when being positioned on the heat control assembly 210. The mechanism 216 may also be adapted to close in an automated manner when the cooking vessel is removed from the top surface 904. Therefore, the mechanism 216 is adapted to operate based on the weight of the cooking vessel. In an embodiment, the mechanism 216 may include springs, gears, and any other component to support the automatic opening and closing.

Considering that the cooktop 802 remains closed when not in use, undesirable heat loss is minimized. The mechanism 216 additionally acts as a safety feature by preventing unintentional contact of human parts with the hot surface. Moreover, any foreign material, such as residue of any food item cooked in the cooking vessel does not seep inside the cooktop 802.

Figure 9B:
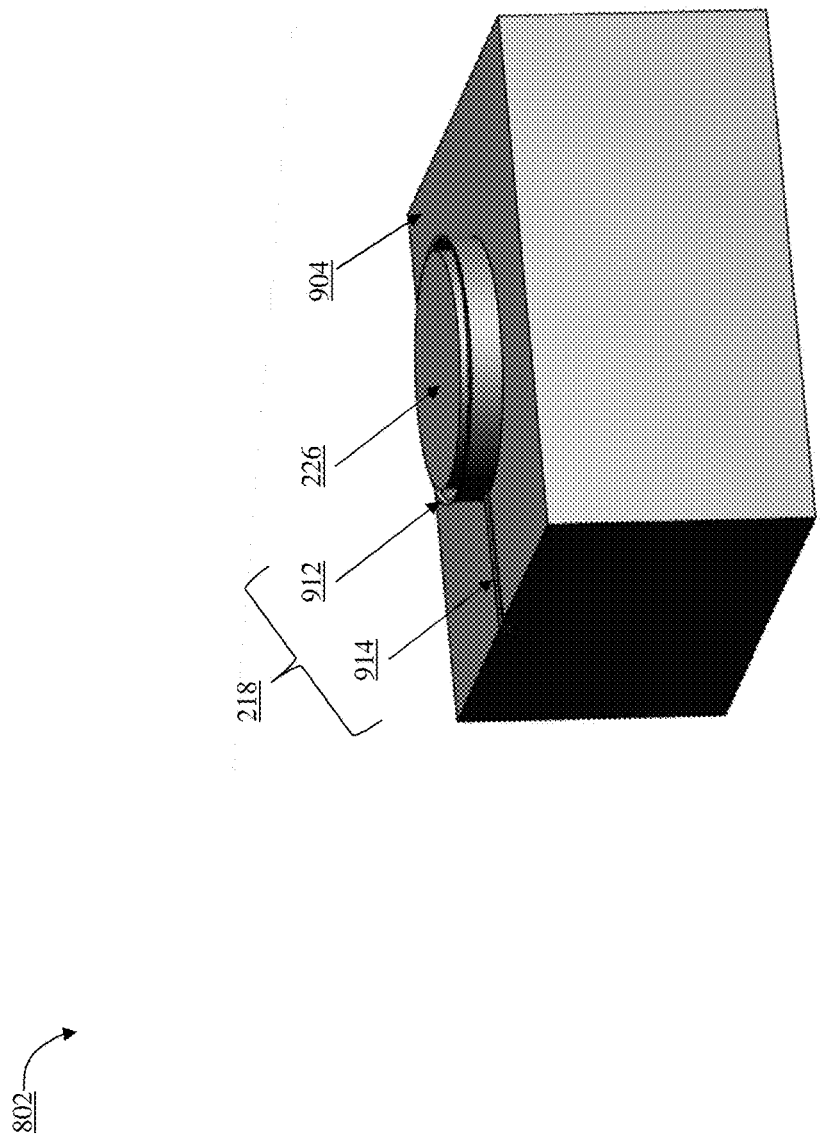
FIG. 9B illustrates a schematic view of the cooktop depicting a spillage prevention unit having a sleeve with a drainage system, according to an embodiment of the present disclosure.

In an embodiment, the solar cooking device 102 may also include a spillage prevention unit 218. FIG. 9B illustrates a schematic view of the cooktop 802 depicting the spillage prevention unit 218, according to an embodiment of the present disclosure. In an embodiment, the spillage prevention unit 218 may include, but is not limited to, a sleeve 912 adapted to be inserted in between the space of the thermal battery 204 in such a manner that it covers the outer periphery of the cooktop 802 and the inner periphery of the top surface 904 such that the sleeve 912 is formed adjacent to the periphery of the adjustable opening mechanism 216. Further, the spillage prevention unit 218 may include a drainage groove 914 running along the height and/or perpendicular to the height of the cooktop 802. Therefore, the spillage prevention unit 218 may be adapted to direct any foreign material out of the solar cooking device 102.

As would be appreciated by a person skilled in the art, the spillage prevention unit 218 may be adapted to bridge the minute gap between the thermal battery 204 and the insulation and avoid ingress of liquids and solids entering the inside of the cooktop 802 and the thermal battery 204. The spillage preventive device is very essential for the long life of the solar cooking device 102 as well as to prevent the loss of precious heat stored in the thermal battery 204.

Figure 9C:
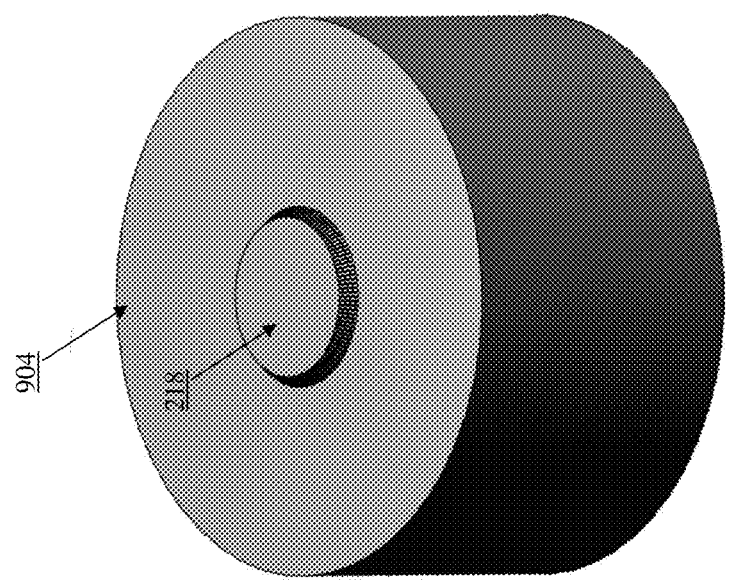
FIG. 9C illustrates a schematic view of the cooktop depicting the spillage prevention unit, according to another embodiment of the present disclosure.

In another embodiment, the spillage prevention unit 218 may be formed in form of an outwardly sloping thin plate that is inserted in the cooktop 802 covering the gap where the insulation is exposed between the top surface 904 and the cooktop 802 as well as the thermal battery 204. FIG. 9C illustrates a schematic view of the cooktop 802 depicting the spillage prevention unit 218, according to another embodiment of the present disclosure. In the illustrated embodiment, the spillage prevention unit 218 formed as a plate may be insulated from the bottom, slightly sloping outwardly om the top surface 904 from the cooktop 802. Further, the plate is provided on the top surface 802 of the thermal battery 204 to act as an effective spillage control mechanism. In an embodiment, the plate may be formed as inverted or direct O-ring or a huge extended washer plate. The plate in the proposed construction shall help the spilled liquid and other materials to flow away from the hot surface and prevent ingress of the spilled material inside the insulation.

Figure 9D:
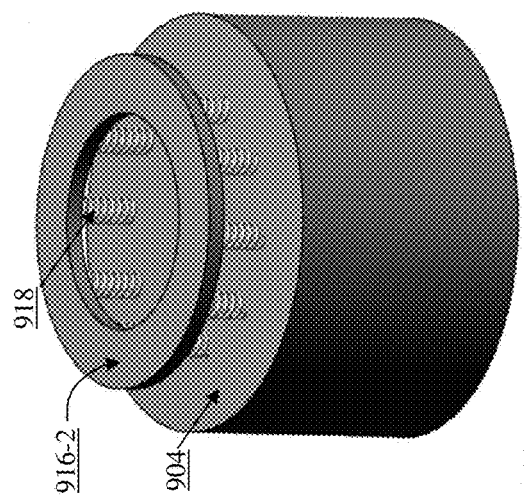
FIG. 9D illustrates schematic perspective views of the cooktop having weight-based retractable ring units, according to a pair of embodiments of the present disclosure.
Figure 9D:
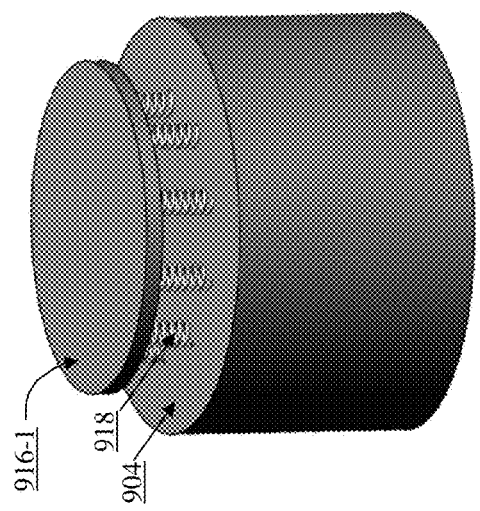

In an embodiment, the solar cooking device 102 may include a weight-based retractable ring disposed on the cooktop 802. FIG. 9D illustrates schematic perspective views of the cooktop 802 having weight-based retractable ring units 916, according to a pair of embodiments of the present disclosure. As illustrated, FIG. 9D illustrates two different embodiments of the weight-based retractable ring units 916, namely, 916-1 and 916-2. Further, the weight-based retractable ring units 916 may be supported on the top surface 904 through a plurality of springs 918.

Figure 9E:
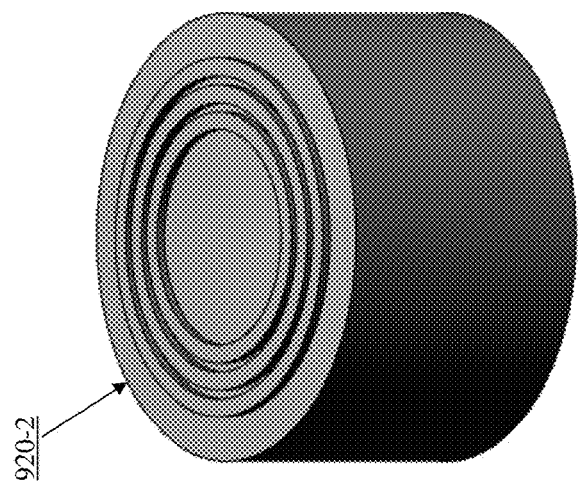
FIG. 9E illustrates a schematic view of the cooktop depicting slit channels, according to a pair of embodiments of the present disclosure.
Figure 9E:
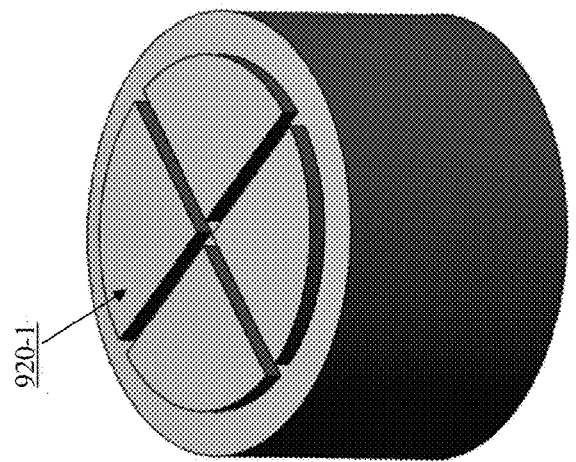

Further, the cooking surface of the cooktop 802 may be of any shape, such as convex, concave, centre slit, threaded, and flat, ensuring that vessels of any shape and size can be accommodated on the cooktop 802. FIG. 9E illustrates a pair of embodiments of the cooktop 802 depicting slit channels 920, according to an embodiment of the present disclosure. As illustrated, the cooking surface 802 may have slit channels 920-1, 920-2 to accommodate any cooking surface made of similar or different metallurgy to increase or decrease the heat conduction to the utensils.

Figure 9F:
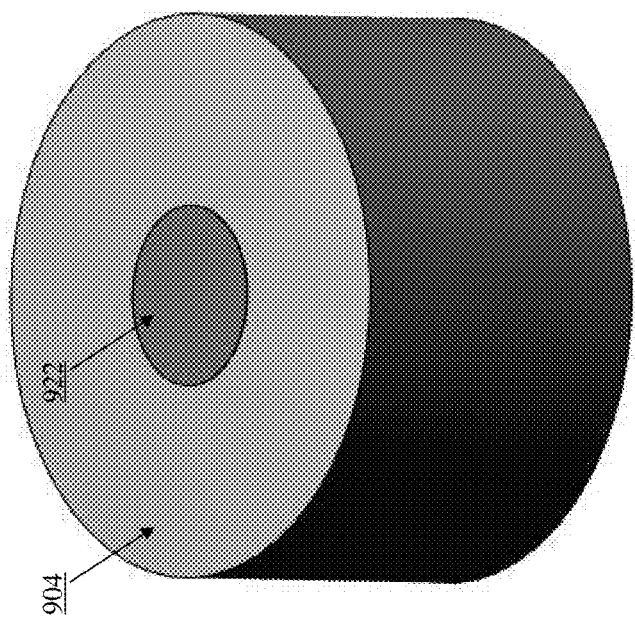
FIG. 9F illustrates a schematic view of the cooktop depicting an integrated coating, according to an embodiment of the present disclosure.

Further, in an embodiment, the solar cooking device 102 may include an integrated coating adapted to be disposed between the cooking vessel and the cooktop 802 for further enhancing the heat transmission to the cooking vessel. FIG. 9F illustrates a schematic view of the cooktop 802 depicting the integrated coating 922, according to an embodiment of the present disclosure. The coating 922 may be formed of a highly conducting material including, but not limited to, copper, silver, gold, Aluminum, and Beryllium.

Figure 9G:
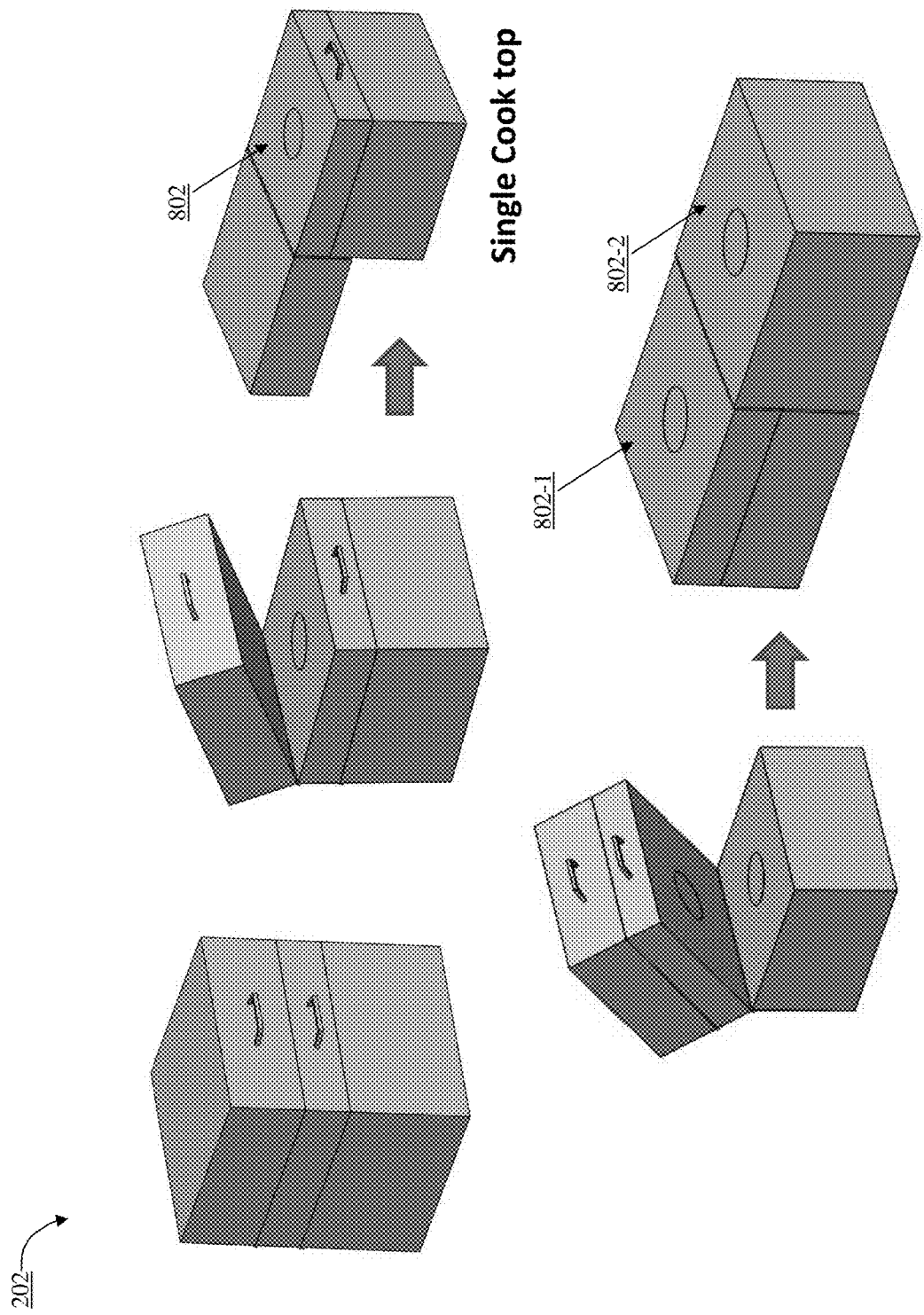
FIG. 9G illustrates the thermal battery depicting splitable design to provide one or more cooking surfaces, according to various embodiments of the present disclosure.

In the embodiment, the cooktop 802 may include multiple burners allowing positioning of multiple cooking vessels. In an embodiment of the cooktop 802, the thermal battery 204 may be made to act as a single or double or multiple cooktops. In an embodiment, the thermal battery 204 may be formed such that it can be split open into more than one cooktop 802. FIG. 9G illustrates the thermal battery 204 depicting splitable design to provide one or more cooktops 802, according to various embodiments of the present disclosure. The multiple cooking surfaces may enable cooking in multiple utensils simultaneously on the same cooking device. For example, in an embodiment, the thermal battery 204 may provide two cooktops 802, namely, 802-1 and 802-2.

Further, the solar cooking device 102 may include a sensing unit (not shown) disposed in connection with at least one of the top surface 904 and the cooktop 802 and adapted to indicate temperature of at least one of the top surface 904 and the cooktop 802, respectively. In an embodiment, the sensing unit may be a strip of heat sensing material adapted to change color depending on the temperature of the heating surface. In an embodiment, the solar cooking device 102 may include an LED adapted to illuminate when the temperature of the heating surface is above a predefined threshold value, indicating that the surface is hot. This would help the user to determine the temperature of the cooking surface without contacting the surface and acts as a safety feature.

Figure 10:
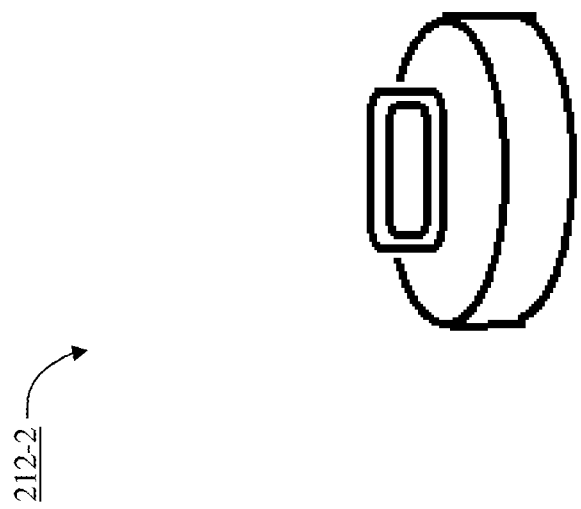
FIG. 10 illustrates schematic views of a pair of cover lids of the solar cooking device, according to an embodiment of the present disclosure.
Figure 10:
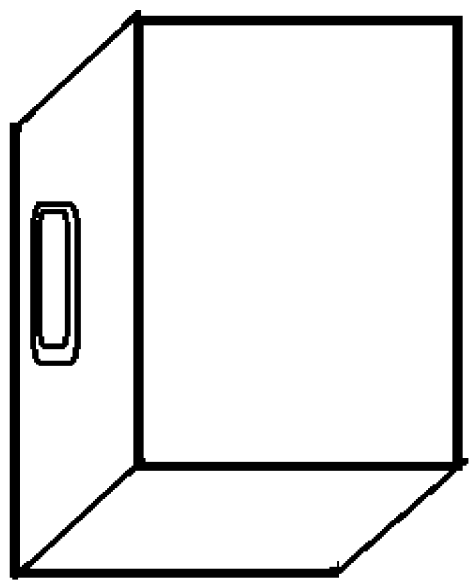

In an embodiment, the solar cooking device 102 may also include a detachable cover lid 212 adapted to cover a sub-assembly of the housing 202, the thermal battery 204 having the cooktop 802, the first heater 206, the second heater 208, and the heat control assembly 210. FIG. 10 illustrates schematic views of a pair of cover lids 212 of the solar cooking device 102, according to an embodiment of the present disclosure. In an embodiment, each cover lid 212 may include at least one insulation layer.

The cover lid 212-1 may be adapted to be positioned over the abovementioned sub-assembly to reduce the standby heat loss over the night. Further, the cover lid 212-2 may be adapted to be positioned on top surface of the cooktop 802 while cooking in idle time for minimizing heat losses.

Referring to FIG. 2B, the solar cooking device 102 may include a base insulation 220 and a cover insulation 222 for the housing 202 and the cover lid 212-1, respectively. Further, the solar cooking device 102 may include a high temperature resistant sheet 224 disposed between the cover lid 212-2 and the adjustable opening mechanism 216. The solar cooking device 102 may also include a plate 228 for supporting the first heater 206 in the housing 202.

In an embodiment, the solar cooking device 102 may be disposed on the floor. In another embodiment, the solar cooking device 102 may be disposed on a stand 230 for added user convenience. The stand 230 may include rollers to assist its easy movement and user convenience. In such an embodiment, the space of the stand 230 beneath the solar cooking device 102 may be utilized for storage purpose. In another embodiment, the space may be utilized to accommodate a hot case 232 to keep the cooked food warm. This feature may create the hot case 232 in the solar cooking device 102 by utilizing the heat leaving the thermal battery 204 and the cooktop 802 and can be utilized to keep the cooked food warm.

Referring to FIG. 1 to FIG. 10, the apparatus 100 may include a controller 108 in communication with the solar array 104 and the mains supply adapter 106. In an embodiment, the controller 108 may include, but is not limited to, a processor, memory, modules, and data. The modules and the memory may be coupled to the processor.

The processor can be a single processing unit or several units, all of which could include multiple computing units. The processor may be implemented as one or more microprocessors, microcomputers, microcontrollers, digital signal processors, central processing units, state machines, logic circuitries, and/or any devices that manipulate signals based on operational instructions. Among other capabilities, the processor is configured to fetch and execute computer-readable instructions and data stored in the memory.

The memory may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The modules, amongst other things, include routines, programs, objects, components, data structures, etc., which perform particular tasks or implement data types. The modules may also be implemented as, signal processor(s), state machine(s), logic circuitries, and/or any other device or component that manipulate signals based on operational instructions.

Further, the modules can be implemented in hardware, instructions executed by a processing unit, or by a combination thereof. The processing unit can comprise a computer, a processor, such as the processor, a state machine, a logic array, or any other suitable devices capable of processing instructions. The processing unit can be a general-purpose processor which executes instructions to cause the general-purpose processor to perform the required tasks or, the processing unit can be dedicated to performing the required functions. In another embodiment of the present disclosure, the modules may be machine-readable instructions (software) which, when executed by a processor/processing unit, perform any of the described functionalities. In an embodiment, the data serves, amongst other things, as a repository for storing data processed, received, and generated by one or more of the modules.

The controller 108 may be adapted to detect a value of temperature of the thermal battery 204. In an embodiment, the solar cooking device 102 may include a thermocouple 112 in connection with the controller 108 and adapted to detect the temperature of the thermal battery 204. The controller 108 may then compare the detected value with a predefined threshold value. Based on the comparison, the controller 108 may control supply of thermal energy from at least one of the solar array 104 and the mains supply to the first heater 206 and the second heater 208, respectively.

In an embodiment, when a voltage of the solar array 104 is detected to be below a predefined threshold value, the controller 108 may be adapted to supply thermal energy from the solar array 104 to the first heater 206 and to supply thermal energy from the mains supply to the second heater 208.

In an embodiment, the controller 108 may be configured to assign the solar array 104 and the mains supply as the primary energy source and the secondary energy source, respectively. The controller 108 facilitates the power supply to the first heater 206 from the solar array 104. When the voltage of the solar array 104 drops below the predefined threshold value, the controller 108 may initiate energizing of the second heater 208 from the mains supply. In an embodiment when the second heater 208 is being energized from the mains supply and there is some amount of power available in the solar array 104, the controller 108 may allow the power transmission from the mains supply as well as the solar array 104.

In an example when the temperature is detected to be of a predefined upper threshold value, say, 350° C., the controller 108 may be adapted to disconnect the power supply from the solar array 104 and the mains supply to the first heater 206 and the second heater 208, respectively. Therefore, the thermal battery 204 is not charged anymore.

Now when the thermocouple 112 detects the temperature to be falling below the predefined threshold value, the controller 108 may connect the power supply from the solar array 104 to the first heater 206 based on the predefined preference. In an embodiment when the thermocouple 112 detects the temperature to be 100° C., the controller 108 may connect the mains supply to the second heater 208.

In an embodiment, once the temperature of the heated surface is at the predefined threshold value, i.e., 350° C., the surplus energy generated through the solar array 104 may be provided to other load at the same voltage. In an embodiment, the apparatus 100 may include a connecting terminal to connect with any other load.

Further, the apparatus 100 may include a control panel 110 external to the solar cooking device 102. In an embodiment, the control panel 110 may include at least one of a charging mode indicator, a cooking mode indicator, and a temperature indicator. The charging mode may include, but is not limited to, a solar array mode, a mains supply mode, and a hybrid mode. As the name suggests, in the solar array mode, the thermal battery 204 is charged from the solar array 104 through the first heater 206. Further, in the mains supply mode, the thermal battery 204 is charged from the mains supply through the second heater 208. Similarly, in the hybrid mode, the thermal battery 204 is charged from both the solar array 104 and the mains supply.

In an embodiment, the control panel 110 may include an LED indicator panel for depicting the source of energy being connected with the solar cooking device 102. The LED indicator panel may include one or more colored LEDs for indicating different operational modes of the solar cooking device 102. In an embodiment, a green light may indicate the operation of the solar cooking device 102 in the solar array mode. Further, a red light may indicate the operation of the solar cooking device 102 in the mains supply mode. Furthermore, a blue light may indicate the operation of the solar cooking device 102 in the hybrid mode. Furthermore, an orange light may indicate that the surplus energy generated from the solar array 104 is provided to other auxiliary loads. In an embodiment, the control panel 110 may also include a display screen indicating charging status of the thermal battery 204. Once the thermal battery 204 attains the suitable high temperature, say, in the range of 300-400° C. through heating by the heaters 206, 208, food can be cooked on the top flat portion, i.e., the cooktop 802, of the same. The solar array 104 may always be connected to the first heater 206 and provide energy to heat the thermal battery 204 while cooking, leading to high efficiency of the solar cooking device 102.

As would be gathered, the present invention discloses the apparatus 100 having the solar array 104, the thermal battery 204, the first heater 206, the second heater 208, and the mains supply adapter 106. The solar cooking device 102 is stationary and rechargeable. Further, the solar cooking device 102 is adapted to collect the solar energy, convert the solar energy into heat through specialty designed optimized resistance of heaters 206, 208, the separate heaters 206 and 208 operating on different power sources for minimization a electricity-to-heat conversion losses, store thermal energy in the thermal battery 204, and recover the thermal energy in controlled manner (on demand energy release) for use in cooking (indoor). The solar cooking device 102 can get charged and discharged at the same time while performing its function of indoor cooking. The solar cooking device 102 can perform all modes of cooking, such as frying, boiling, steaming, and chapati making. It has various heat control, spillage control and safety mechanism for added user convenience and long life of the device. Further, the solar cooking device 102 is modular and can be made in any size depending on the operational requirements.

Further, the present invention offers at least the following advantages over the existing devices:
Stationary, rechargeable, and always kitchen-connected indoor solar cooking.
Detachable heat control assembly 210 for on demand energy release.
High efficiency and utilization: Online cooking mode while charging through the Sun.
High autonomy: long duration heat retention thermal battery 204.
Hybrid Mode: solar+auxiliary energy source (electrical grid) in case of cloudy days.
Utilizes concept of heat of conduction, where a direct contact for heat transfer is provided.
Minimum radiative and conductive heat losses.
Ability to cook food through boiling, steaming, and frying. Rotis can be cooked too.
The cooking device 102 can cater to all time cooking, such as lunch, dinner, and breakfast.
It can be utilized in all weather and seasons including when the Sun is not available for long durations or for continuous days, such as monsoons and extreme winters.
The solar cooking device 102 offers a 2-in-1 functionality of a cooking device and a hot case 232 for storing cooked food.
Utilization of surplus solar energy to directly operate other electrical loads/appliances, such as agricultural pumps, LED bulb, mobile charger, home power packs, LED lanterns etc
The surplus solar power can also be sent for storage of the energy in an electrical battery for further uses.
Safe in operation as well as maintenance.
Minimum maintenance requirement
Simultaneous charging through different power sources.
Simultaneous charging and discharging while being used for cooking.
Robust and effective heat control mechanism.
Optimization of heaters.
Optimization of insulation of various components.

Therefore, the apparatus 100 and the solar cooking device 102 of the present disclosure offers stationary, modular, and indoor kitchen cooking through solar energy, heat control for on demand energy release, high autonomy, full range of cooking, efficient safety features, spill-proof design, online cooking mode (same time charging and discharging) and demands minimum maintenance.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:
1. A modular kitchen-connected indoor stationary solar cooking device, comprising:
   a housing;
   a thermal battery disposed in the housing and adapted to store thermal energy, the thermal battery comprising external threads on a top peripheral surface;

a first heater disposed to be in contact with the thermal battery, wherein the first heater is coupled to a solar array and adapted to receive solar energy for charging the thermal battery;

a second heater disposed to be in contact with the thermal battery, wherein the second heater is coupled to a mains supply and adapted to receive electrical supply for charging the thermal battery; and a heat control assembly disposed on a cooktop of the thermal battery and adapted to accommodate a cooking vessel, wherein the heat control assembly is adapted to rotate for controlling a heat supply for cooking in the cooking vessel, the heat control assembly adapted to removably engage with the thermal battery to control a cooking temperature, the heat control assembly comprising:

a top plate adapted to accommodate the cooking vessel thereon;

a ring portion formed at a bottom of the top plate and comprising internal threads adapted to engage with the external threads of the thermal battery; and a handle adapted to rotate the top plate to control an engagement of the internal threads of the ring portion with the external threads of the thermal battery to vary contact area of the top plate for controlling the cooking temperature of the cooking vessel.

2. The solar cooking device of claim 1, wherein the top peripheral surface of the thermal battery acts as the cooktop.

3. The solar cooking device of claim 1, wherein the cooktop is carved out as a part of the thermal battery.

4. The solar cooking device of claim 1, wherein the heat control assembly comprises at least one clamp support for locking the top plate with the housing in a predefined position and for locking the cooking vessel on the top plate.

5. The solar cooking device of claim 1, wherein the first heater and the second heater are disposed to contact a bottom surface and the top peripheral surface, respectively, of the thermal battery.

6. The solar cooking device of claim 1, wherein the first heater and the second heater are integratedly embedded with the thermal battery.

7. The solar cooking device of claim 1, wherein the first heater and the second heater are adapted to separately and simultaneously accept energy from different sources and nature for charging the thermal battery.

8. The solar cooking device of claim 1, wherein the thermal battery comprises at least one of a thermal storage material, a sensible heat material, a petroleum derivative, and a phase change material.

9. The solar cooking device of claim 1, wherein the thermal battery is of at least one of a cylindrical profile, a cuboidal profile, a conical profile, and a pyramidical profile.

10. The solar cooking device of claim 1, wherein the thermal battery and an inner surface of the housing are insulated with at least one of Asbestos, Fiberglass, Ceramic fiber, and Polycrystalline fiber.

11. The solar cooking device of claim 1, wherein outer surfaces of the thermal battery and inner surface of the housing are coated with a heat-resistant and thermal-insulation paint.

12. The solar cooking device of claim 11, wherein an outer surface of the thermal battery is insulated in a graded manner, by a first layer of a high temperature heat resistant paint, a second layer of a reflector formed on the first layer, and a third layer of another insulation material formed on the second layer.

13. The solar cooking device of claim 1, comprising an adjustable opening mechanism formed on the cooktop and adapted to:

open to accommodate the cooking vessel for cooking, wherein the adjustable opening mechanism opens based on a pressure of the cooking vessel when being positioned on the heat control assembly; and close in an automated manner when the cooking vessel is removed from a top surface.

14. The solar cooking device of claim 13, comprising a spillage prevention unit, the spillage prevention unit comprising:

a sleeve adapted to be inserted in between a space of the thermal battery in such a manner that it covers an outer periphery of the cooktop and an inner periphery of the top surface such that the sleeve is formed adjacent to a periphery of the adjustable opening mechanism; and a drainage groove running perpendicular and/or along a height of the cooktop, wherein the sleeve and the drainage groove are adapted to direct any foreign material out of the solar cooking device.

15. The solar cooking device of claim 14, wherein the spillage prevention unit is formed as a plate insulated from the bottom and formed slightly outward on the top surface from the cooktop, wherein the plate is formed as an extended washer plate.

16. The solar cooking device of claim 1, wherein the thermal battery is adapted to be split open to form multiple cooktops to receive multiple cooking vessels.

17. The solar cooking device of claim 13, comprising a sensing unit disposed in connection with at least one of the top surface and the cooktop, and adapted to indicate surface temperature.

18. The solar cooking device of claim 1, comprising a detachable cover lid comprising of at least one insulation layer and adapted to cover a sub-assembly of the housing, the thermal battery, the first heater, the second heater, and the heat control assembly.

19. A solar cooking apparatus, comprising:

a solar array;

a mains supply adapter; and a modular kitchen-connected indoor stationary solar cooking device coupled to the solar array and the mains supply, the solar cooking device comprising:

a housing;

a thermal battery disposed in the housing and adapted to store thermal energy, the thermal battery comprising external threads on a top peripheral surface;

a first heater disposed to be in contact with the thermal battery, wherein the first heater is coupled to a solar array and adapted to receive solar energy for charging the thermal battery;

a second heater disposed to be in contact with the thermal battery, wherein the second heater is coupled to the mains supply and adapted to receive electrical supply for charging the thermal battery; and a heat control assembly disposed on a cooktop and adapted to accommodate a cooking vessel, wherein the heat control assembly is adapted to control a heat supply for cooking, the heat control assembly adapted to removably engage with the thermal battery to control a cooking temperature, the heat control assembly comprising:

a top plate adapted to accommodate the cooking vessel thereon;

a ring portion formed at a bottom of the top plate and comprising internal threads adapted to engage with the external threads of the thermal battery; and a handle adapted to rotate the top plate to control an engagement of the internal threads of the ring portion with the external threads of the thermal battery to vary contact area of the top plate for controlling the cooking temperature of the cooking vessel.

20. The solar cooking apparatus of claim 19, comprising a controller in communication with the solar array and the mains supply adapter, the controller adapted to:
   detect a value of temperature of the thermal battery;
   compare the detected value with a predefined threshold value; and
   control supply of thermal energy from at least one of the solar array and the mains supply to the first heater and the second heater, respectively, based on the comparison.

21. The solar cooking apparatus of claim 20, wherein the controller is adapted to:
   supply thermal energy from the solar array to the first heater; and
   supply thermal energy from the mains supply to the second heater, when a voltage of the solar array is detected to be below a predefined threshold value.

22. The solar cooking apparatus of claim 19, comprising a control panel having at least one of a charging mode indicator, a cooking mode indicator, and a temperature indicator.

23. The solar cooking apparatus of claim 19, comprising a hot case disposed in a storage space of a stand below the solar cooking device.

* * * * *